United States Patent
Chen et al.

(10) Patent No.: US 7,202,870 B2
(45) Date of Patent: Apr. 10, 2007

(54) DISPLAY CONTROLLER PROVIDED WITH DYNAMIC OUTPUT CLOCK

(75) Inventors: Jiunn-Kuang Chen, Taoyuan (TW); Wen-Ho Hsiao, Hsinchu (TW); Hsu-Lin FanChiang, Hsinchu (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 120 days.

(21) Appl. No.: 10/291,833

(22) Filed: Nov. 12, 2002

(65) Prior Publication Data

US 2003/0184678 A1    Oct. 2, 2003

Related U.S. Application Data

(60) Provisional application No. 60/369,524, filed on Apr. 1, 2002.

(51) Int. Cl.
*G06T 1/00* (2006.01)

(52) U.S. Cl. .................... 345/501; 345/100; 348/511

(58) Field of Classification Search ............... 345/556, 345/571, 471, 574, 634, 560, 213, 581, 100, 345/558, 501; 327/175, 107; 375/371, 354; 370/230; 711/167; 348/511

See application file for complete search history.

(56) References Cited

U.S. PATENT DOCUMENTS 5,739,867 A * 4/1998 Eglit .......................... 348/581
5,977,805 A * 11/1999 Vergnes et al. ............. 327/107

* cited by examiner

*Primary Examiner*—Mark Zimmerman
*Assistant Examiner*—Mike Rahmjoo
(74) *Attorney, Agent, or Firm*—Michael Bednarek; Paul, Hastings, Janofsky & Walker LLP (57) ABSTRACT

The present invention provides a display controller for scaling an input source image. The display controller dynamically adjusts the output clock so line buffer requirement is reduced to a minimum to balance input and output image timing for image scaling or non-scaling to destination devices. The present invention supports up-scaling and down-scaling or bypass. The blocks of the line buffer operates in a continuous and cyclical manner according to the status signal generated by the line buffer status detector and the output clock. As a result, any buffer overrun or underrun condition will be immediately corrected by the timing and therefore the number of blocks of line buffer are greatly reduced.

18 Claims, 10 Drawing Sheets

DISPLAY CONTROLLER PROVIDED WITH DYNAMIC OUTPUT CLOCK

This application claims the benefit of Provisional Application No. 60/369,524, filed Apr. 1, 2002.

BACKGROUND OF THE INVENTION

1. Field of the Invention

The present invention generally relates to a display system. More particular, the present invention relates to a display controller provided with dynamic output clock.

2. Description of Related Arts

Display systems are employed to process source image data into output image data for displaying on a display screen thereof. The source image data is usually provided by a graphics controller such as a graphics card, video decoder, digital camera, etc. and the resolution of the source image data is normally predetermined. Therefore, the source image data has to be resized or scaled to the appropriate resolution such that the display screen can correctly display the output image data. Accordingly, a device used to process the source image data into the associated output image data is so-called a "display controller."

The display controller usually utilizes a line buffer for read/write operations, which normally subjects to underrun or overrun due to read/write racing. Although firmware adjustment approach has been conventionally utilized to solve the underrun or overrun issues, the user is required to realize the detailed operations of the display controller and manually adjust the associated parameters via the firmware intervention.

Thus, there is a need for a simple hardware-implemented display controller for automatically scaling an image that gives good image output quality, fast tuning result, and a user-friendly interface.

SUMMARY OF THE INVENTION

It is an object of the present invention to provide a display controller for dynamically adjusting the time period of an output clock so as to balance the input line rate and the output line rate during access of a line buffer while keeping memory requirement to a minimum value.

For fulfilling the aforementioned object, the present invention provides a display controller provided with dynamic output clock, which comprises a line buffer, an input means, an output means, a status detector, and a clock generator. The input means is used to write line data into the line buffer at an input line rate, and the output means is used to read the written line data from the line buffer at an output line rate. The status detector is coupled to the input means and the output means for generating a status signal indicating whether the input line rate and the output line rate are unbalanced. The clock generator is utilized to dynamically adjust the output line rate in response to the status signal until the input line rate and the output line rate reach a balance.

Moreover, the present invention provides a method for balancing an input line rate and an output line rate of a display controller comprising the following steps of: (a) writing line data into a line buffer at the input line rate; (b) reading the written line data from the line buffer at the output line rate based upon an output clock; (c) detecting a write position currently writing into the line buffer and a read position currently reading the line buffer; (d) generating a position difference signal in response to the write position and the read position; (e) generating a status signal in response to the position difference signal; (f) dynamically tuning the time period of the output clock and thus adjusting the output line rate; and (g) repeating steps (a)–(f) until the input line rate and the output line rate reach a balance.

It is to be understood that both the foregoing general description and the following detailed description are exemplary, and are intended to provide further explanation of the invention as claimed.

BRIEF DESCRIPTIOIN OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1:
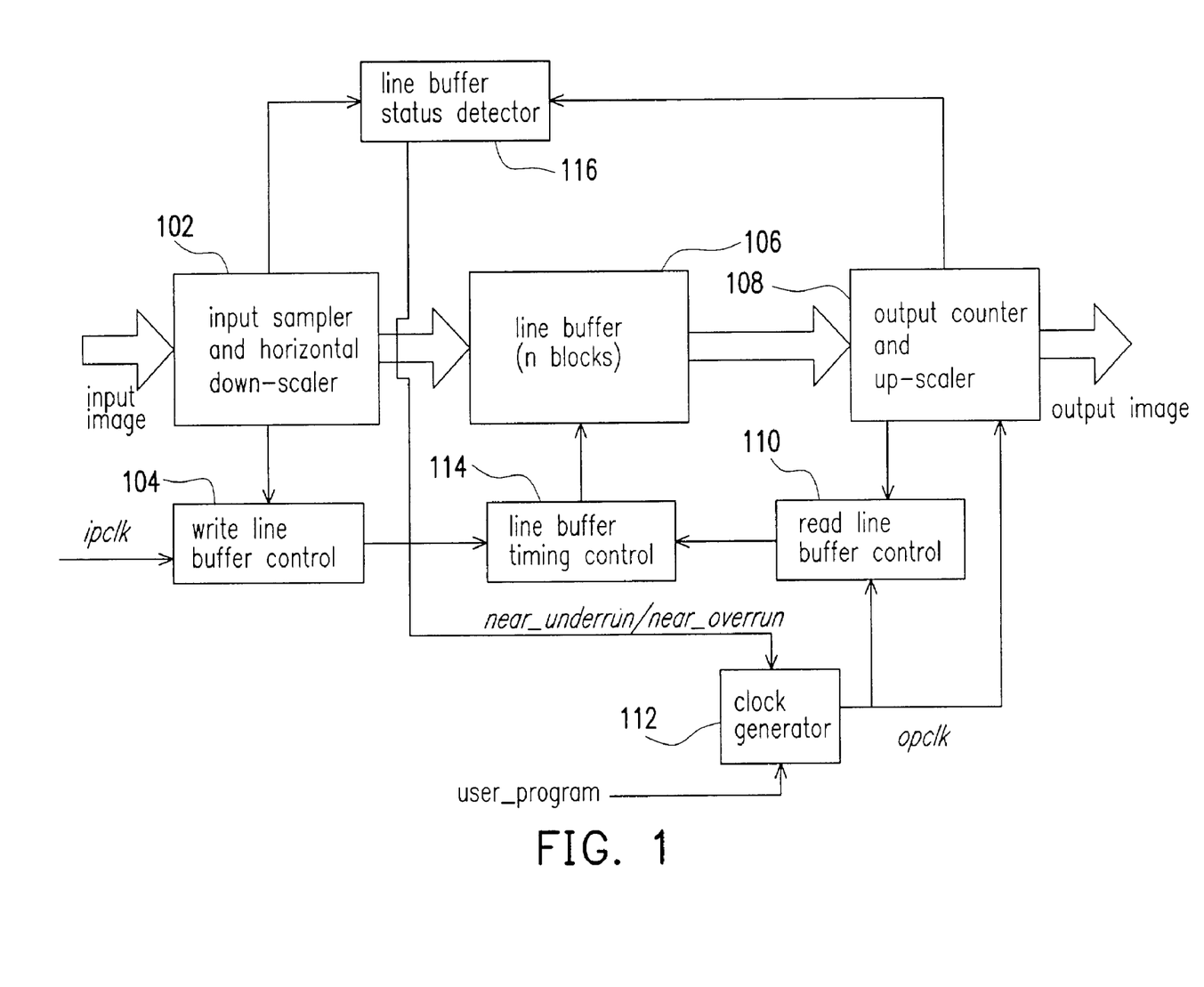
FIG. 1 is a block diagram of a display controller in accordance with one preferred embodiment of the present invention.

FIG. 1 is a block diagram of the display controller for transforming input/output image and controlling timing by adjusting a dynamic output clock for balancing line buffer read/write timing to reduce storage memory size. As shown in FIG. 1, the display controller comprises an input sampler and horizontal down-scaler 102, a write line buffer control 104, a line buffer 106 having n blocks, an output counter and up-scaler 108, a read line buffer control 110, an output clock generator 112, a line buffer timing control 114, and a line buffer status detector 116.

First of all, an input source image will be sampled by the input sampler 102 and, if necessary, horizontally scaled down by the horizontal down-scaler thereof. The processed image data is stored in the line buffer 106 line by line and then outputted to the output counter and up-scaler 108 according to timing control from the line buffer timing control circuit 114. The line buffer 106 can be any type or combination of storage memories, which is used to store the scanned line image data. In this embodiment, the line buffer 106 is provided with n (n being an integer) blocks of memory for storing the inputted scan lines. The line buffer status detectors 116 is connected to the blocks 102 and 108 for detecting read and write line buffer status for determining any buffer underrun or overrun. The output counter and up-scaler 108 receives the output from the line buffer 106 and outputs the final image data to a display device (not shown in the drawing) according to the output clock opclk from the clock generator 112.

Thus, if the line buffer 106 is a SRAM, the write line buffer control circuit 104 will generate a SRAM address, data, and a write-enable (WE) signal. Upon reception of the input source image, the write line buffer control circuit 104 receives an enable signal from the horizontal scaling 102 together with an input clock ipclk to generate the WE signal, when asserted, to write the blocks of line buffer 106. Moreover, the read line buffer control circuit 110 will generate a SRAM address, data, and a read-enable (RE) signal whose polarity is opposite to the WE signal. The read line buffer control circuit 110 receives the output timing from the output counter and up-scaler 108 and generates the RE signal for reading the blocks of the line buffer 106.

The line buffer timing control circuit 114 serves as a line buffer read/write arbiter to switch between the read or write timing of the line buffer 106. The line buffer timing control circuit 114 receives the WE signal from the write line buffer control circuit 104 and the RE signal from the read line buffer control circuit 110 to control the write/read actions of the n blocks in the line buffer 106. The clock generator 112 sends an output clock signal opclk to the read line buffer control circuit 110 and to the output counter and up-scaler 108 for outputting the final image data to the display device. The display controller as depicted in FIG. 1 can easily adjust the output timing without any firmware calculation or programming while keeping the block number n of the line buffer to a minimum value.

Figure 2:
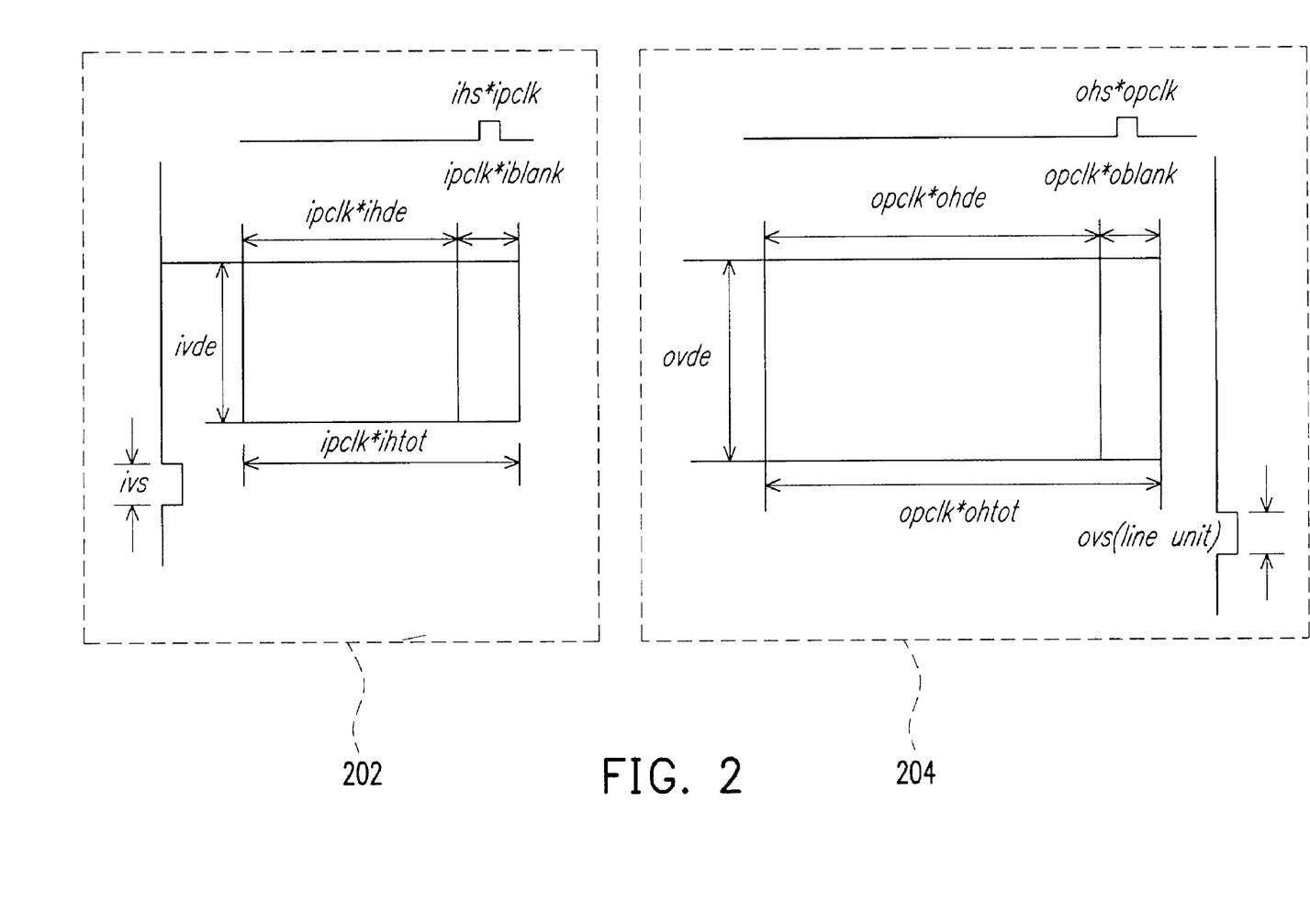
FIG. 2 is a schematic diagram used to explain the relation between the input source image and the output image.

FIG. 2 is a schematic diagram used to explain the relation between the input source image and the output image. In FIG. 2, an input source image 202 is to be scaled to an output image 204. Usually, a frame period includes a display enable (DE) period and a blank period. DE represents the actual time when the source image data is scaled and blank period designates the horizontal/vertical retrace time called horizontal synchronization (HS) and vertical synchronization (VS). The HS and VS are utilized by CRT monitors for polarized scan line retracing, but both are treated as reference signals under the application on LCD monitors. During the blank period, there is an invalid image pixel. Therefore, an entire horizontal line is divided into two parts: one part containing valid image pixels in the display period and the other part containing invalid image pixels in the blank period. Thus, horizontal total pixel period=valid image pixel period+blank image pixel period, and vertical total scan lines=valid image scan lines+ blank image scan lines.

Furthermore, the acronym in FIG. 2 is described as below:
ipclk: input pixel clock;
ihtot: input horizontal total number;
ihde: input horizontal display enable number (valid image pixel period in ihtot), which is the pixel number to be written to the line buffer 106;
iblank: input horizontal blank number (invalid image pixel in ihtot);
ivde: input vertical display enable number (valid pixel scan lines);
ivs: input vertical synchronization scan lines;
opclk: output pixel clock to be generated by the clock generator 112;
ohtot: output horizontal total number;
ohde: output horizontal display enable number (valid image pixel in ohtot), which is the pixel number to be scaled up after reading pixel from the line buffer 106;
oblank: output horizontal blank number (invalid image pixel in ohtot);
ovde: output vertical display enable number; and
ovs: output vertical synchronization scan lines.

The equation (1) that states the relationship of the input pixels:

$$ihtot = ihde + iblank \quad (1)$$

The equation (2) that states the relationship of the output pixels:

$$ohtot = ohde + oblank \quad (2)$$

The equation (3) that defines the input frame display time:

$$\text{input frame display time} = ipclk \times ihtot \times ivde \quad (3)$$

The equation (4) that defines the output frame display time:

$$\text{output frame display time} = opclk \times ohtot \times ovde \quad (4)$$

Therefore, the display controller of the present invention receives the source image data according to the equation (3) and writes it into the line buffer 106. After waiting for a certain period, the display controller generates the output image data to the display device by means of reading and scaling the image data stored in the line buffer 106 in response to the output pixel clock opclk according to the equation (4).

Figure 3:
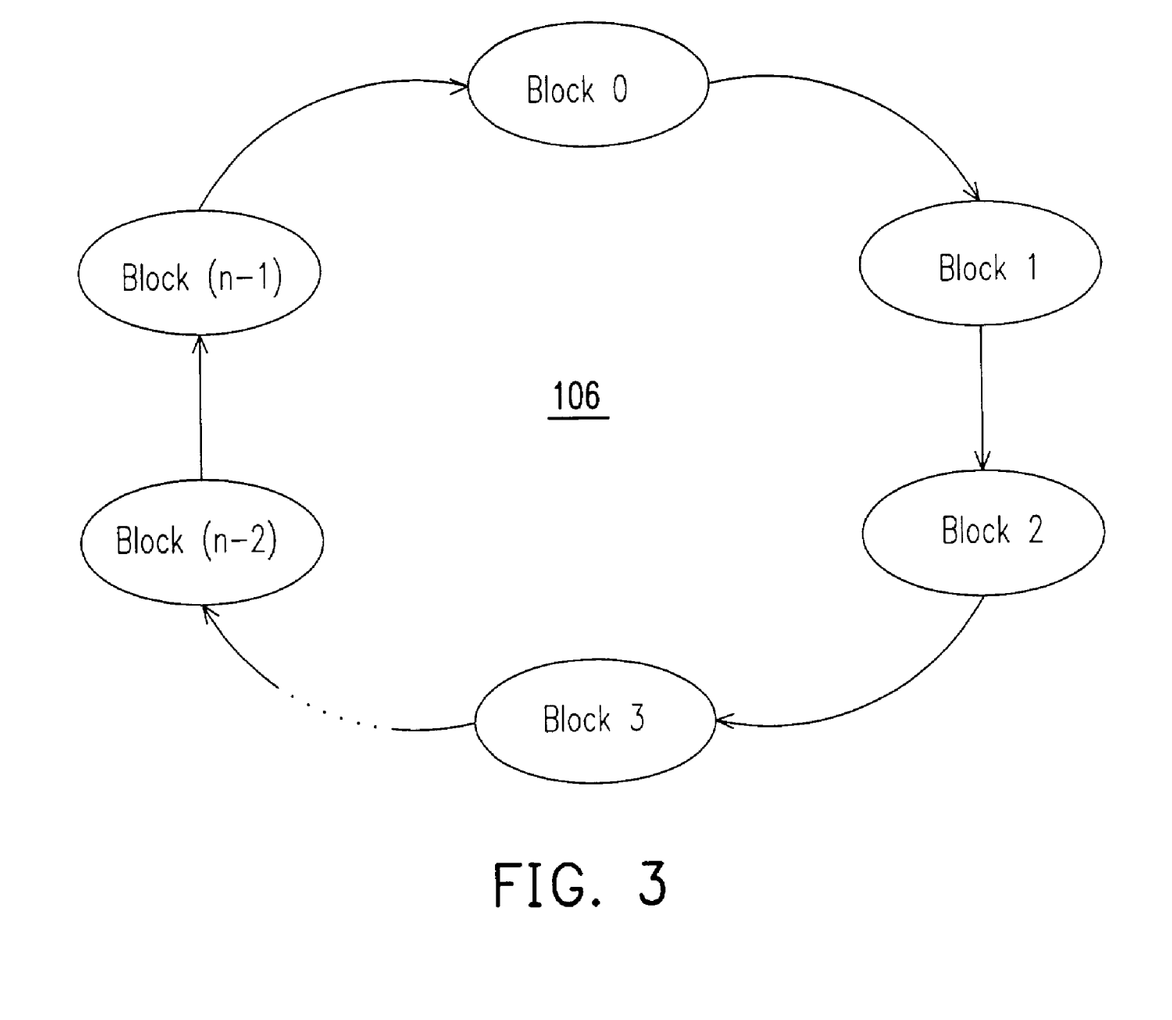
FIG. 3 is a schematic diagram of the line buffer structure of the display controller in accordance with the present invention.

Referring to FIG. 3, a diagram showing the line buffer of FIG. 1 provided with n blocks (preferably, n=2~5) to be connected in the form of a ring buffer in accordance with the present invention is schematically illustrated. By selecting a proper number of blocks, the line buffer 106 configured as a ring buffer can eliminate the impact of write/read racing while maintaining the whole circuit workable. However, although the ring buffer of FIG. 3 can provide buffering mechanism to balance the write speed and read speed, the input and output line rates should be adjusted to reach balance condition, which will be described in details as follows.

The equation (5) that defines the input line rate:

$$\text{Input line rate} = ipclk \times ihtot \quad (5)$$

The equation (6) that defines the output line rate $$\text{Output line rate} = opclk \times ohtot \quad (6)$$

Figure 4:
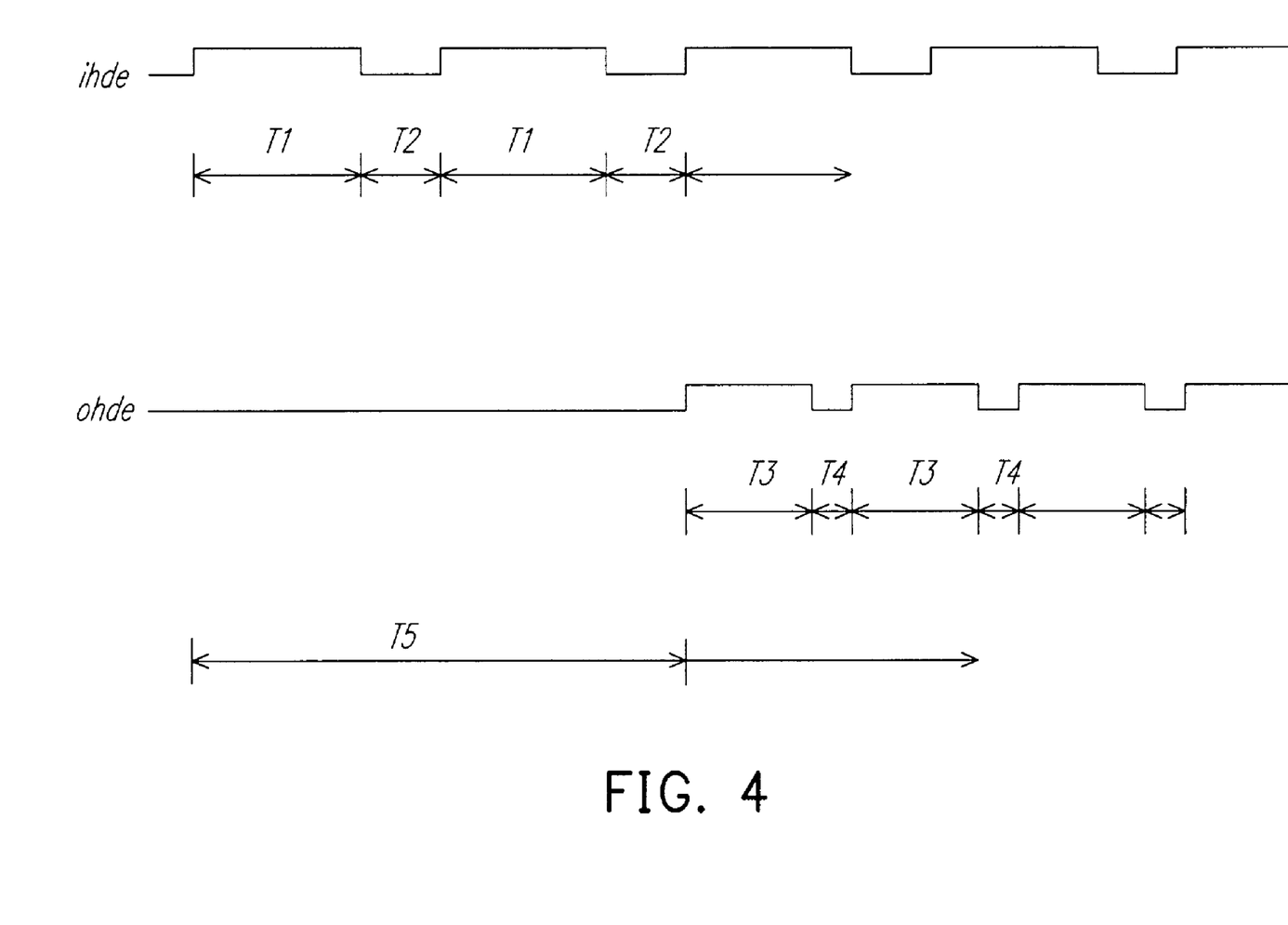
FIG. 4 is a timing diagram of the write and read operations performed on the blocks of the line buffer.

FIG. 4 is a timing diagram of input write and output read sequences used for explanation. Input timing is shown: T1=ipclk×ihde is the time period for writing valid pixels, T2=ipclk×iblank is the blank time period, and T1+T2=ipclk×ihtot is the total period of one input scan line. The display controller sequentially writes each input pixel line during each subsequent T1 period into the line buffer 106 in the sequence of the blocks 0, 1, 2, 3, . . . , n−2, n−1, and then back to the blocks 0, 1, 2, 3, . . . , n−2, n−1, and again and again as depicted in FIG. 3 until the last input valid scan line is written. Output timing is shown: T5 is the wait time during the write operation before the read operation starts. T3=opclk×ohde is the time period for reading valid pixels, T4=opclk×oblank is the blank time period, and T3+T4=opclk×ohtot is the total period of one output scan line. The display controller reads each pixel line during each T3 period from the line buffer 106 in the sequence of the blocks 0, 1, 2, 3, . . . , n−2, n−1, and then back to blocks 0, 1, 2, 3, . . . n−2, n−1 over and over again until the last output scan line is read. However, the following input scan line must be written into the next adjacent block for the write operation, but read operation may not jump to the next adjacent block after reading the output scan line from the preceding block. The following read operation may stay on the same block or not follow consecutively by jumping several blocks based upon the vertical scaling ratio.

Ideally, no overrun or underrun will occur during read/write operations as long as the input line rate and the output line rate reach a balanced condition. However, underrun will occur if the output line rate is too fast, and overrun will occur if the output line rate is too slow. According to the present invention, a dynamic-adjusted output clock is utilized to keep no issue of underrun or overrun during the line buffer read/write operations where ohtot should be well chosen to be greater than 1000 for general purpose display system. In addition, the required blocks of the line buffer 106 can be reduced to a minimum and, furthermore, can be replaced with less area storage device such as FIFOs once the output clock is adjusted properly. The whole adjustment process is well handled by hardware without firmware intervention.

Figure 5:
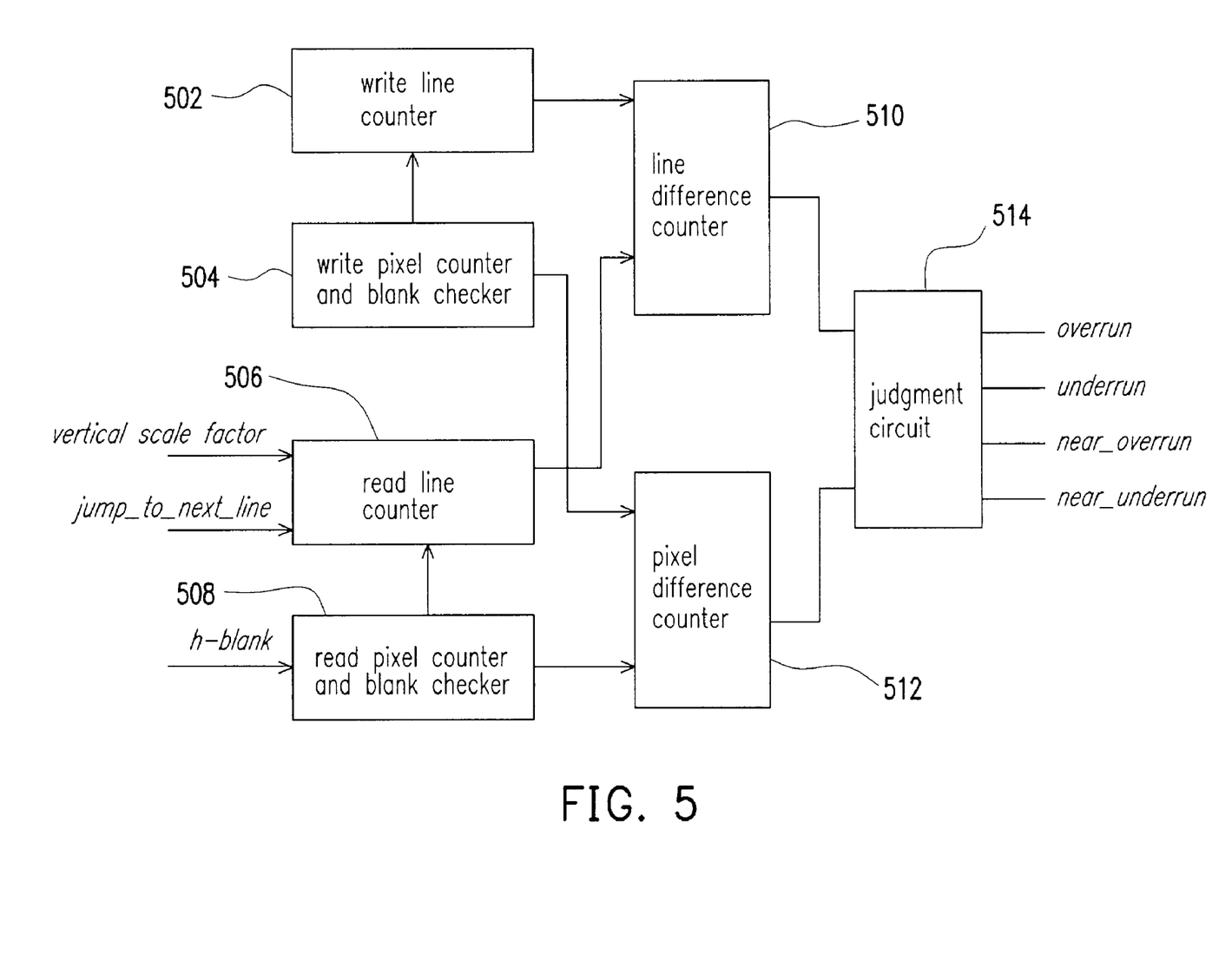
FIG. 5 is a detailed block diagram of the status detector of FIG. 1 in accordance with the present invention.

Referring to FIG. 5, the block diagram of the line buffer status detector 116 in FIG. 1 is schematically illustrated. In FIG. 5, the line buffer status detector 116 comprises a write line counter 502, a write pixel counter and blank checker 504, a read line counter 506, a read pixel counter and blank checker 508, a write/read line difference counter 510, a write/read pixel difference counter 512, and a judgment circuit 514. The write line counter 502 generates a write line count for the write/read line difference counter 510 in response to a write pixel count and a write blank data provided by the write pixel counter and blank checker 504. The read pixel counter and blank checker 508 receives h-blank indicator and generates a read pixel count and a read blank data for the read line counter 506. The read line counter 506 receives a vertical scaling factor and jump-to-next-line indicator, which decides if the read operation stays in the same line or jumps to the next line, wherein the next line does not necessarily mean the next consecutive line and can be the next 2 line.

In addition, the read line counter 506 also generates a read line count to the write/read line difference counter 510 in response to the read pixel count and the read blank data provided by the read pixel counter and blank checker 508. The write/read line difference counter 510 receives the write line count and the read line count from the write line counter 502 and the read line counter 506 respectively, so as to measure the line difference between the corresponding write/read operations. Alternatively, the write/read pixel difference counter 512 receives the write pixel count and the read pixel count from write pixel counter 504 and the read pixel counter 508 respectively, so as to measure the pixel difference between the corresponding write/read operations. The judgment circuit 514 is utilized to derive the status of overrun, underrun, near-underrun and near-overrun indicators in response to the line difference count and the pixel difference count provided by the line difference counter 510 and the pixel difference counter 512 respectively.

In other words, the current write/read positions are detected by the counters 502–508 and the position difference is generated by the counters 510 and 512. Then, the judgment circuit 514 asserts near-underrun indicator, near-overrun indicator or none of them base upon the position difference information provided by the counters 510 and 512. To be clear about the operation of the status detector 116, there are five cases are exemplified as follows.

Case 1: Read and write operations occur at two different but not adjacent blocks of the line buffer 106. Therefore neither underrun nor overrun will occur, i.e. ideal situation.

Figure 6:
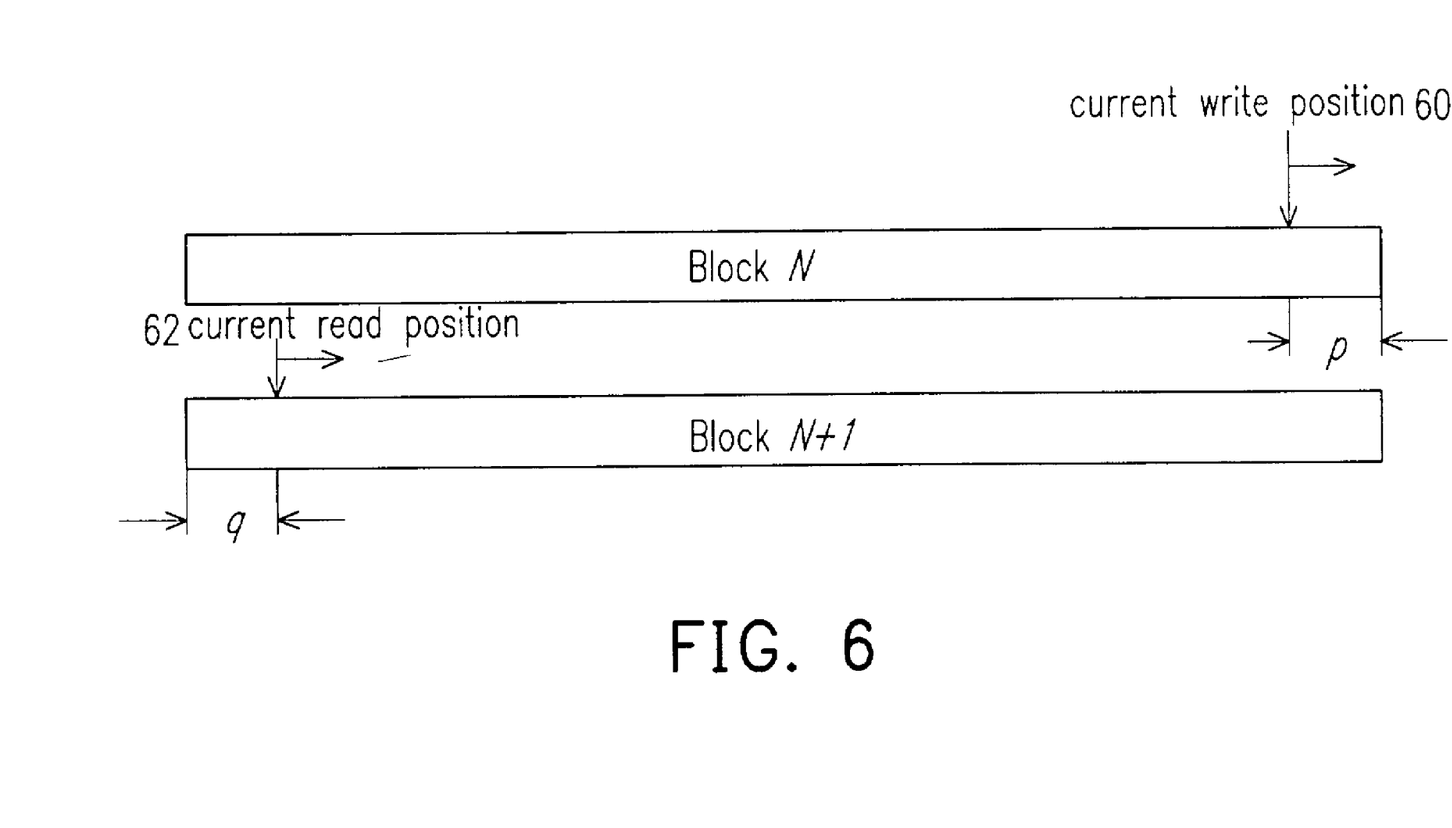
FIG. 6 is a schematic diagram of the write/read operations performed on the blocks of the line buffer, where the write operation is performed on block N and the read operation is performed on block N+1.

Case 2: Read and write operations occur at two adjacent block N and block N+1 of the line buffer 106. Noted that the read and write operations are made on the blocks of the line buffer 106 from left to right as time increases. As shown in FIG. 6, reference numerals 60 and 62 designate the current write position and the current read position respectively. According to the present invention, the status detector 116 is utilized to obtain the line difference and the pixel difference (p+q) by means of the line difference counter 510 and the pixel difference counter 512 respectively. The pixel difference (p+q) is then compared by the judgment circuit 514 with a predetermined threshold value TH. If (p+q)<TH, the near-overrun indicator will be asserted.

Figure 7:
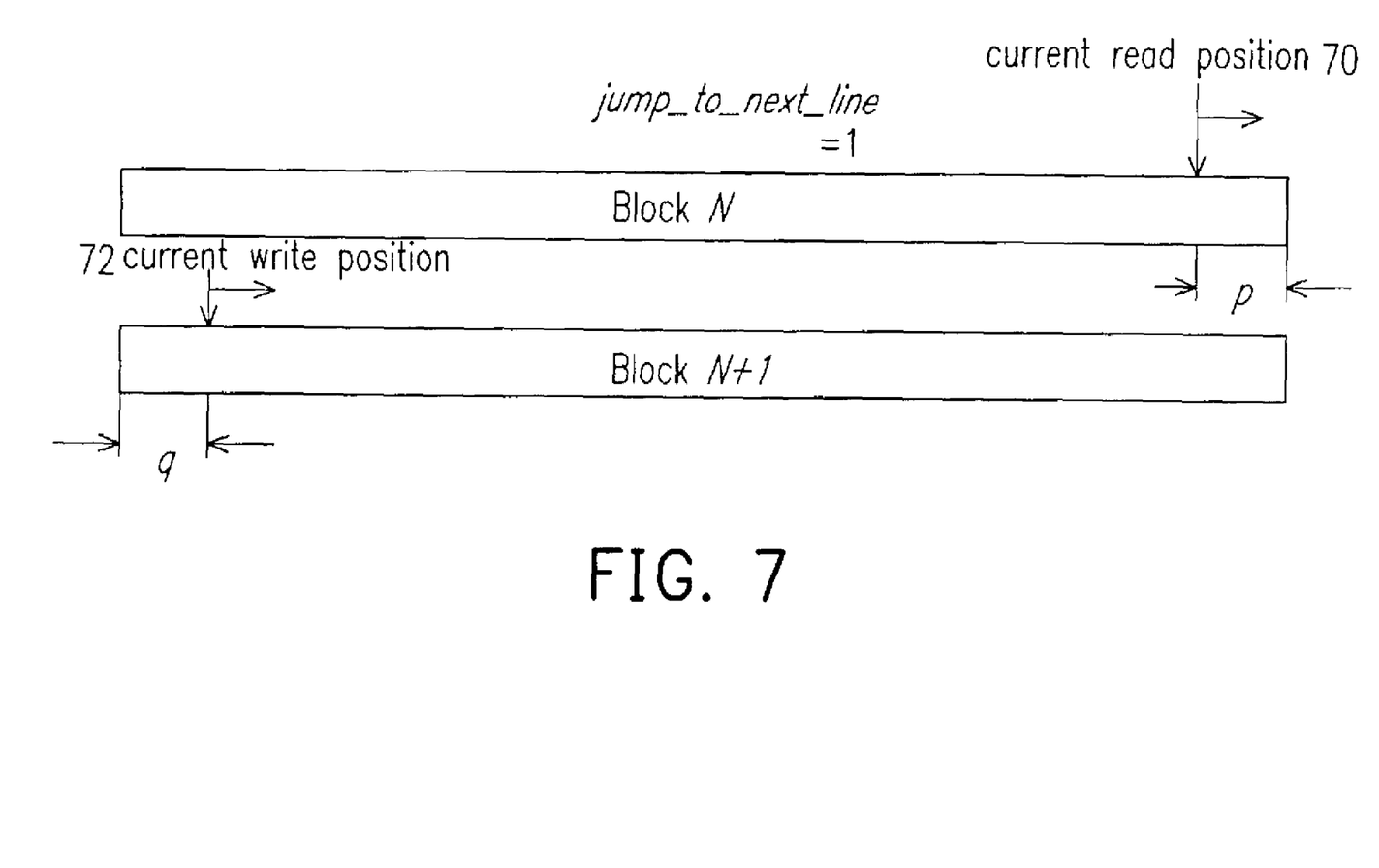
FIG. 7 is a schematic diagram of the write/read operations performed on the blocks of the line buffer, where the read operation is performed on block N and the write operation is performed on block N+1.

Case 3: Read and write operations occur in adjacent block N and block N+1 of the line buffer 106 by assuming that the jump_to_next_line indicator has been asserted. Noted that the read and write operations are made on the blocks of the line buffer 106 from left to right as time increases. As shown in FIG. 7, reference numerals 70 and 72 designate the current read position and the current write position respectively. The status detector 116 is utilized to obtain the line difference and the pixel difference (p+q) by means of the line difference counter 510 and the pixel difference counter 512, respectively. The pixel difference (p+q) is then compared by the judgment circuit 514 with the threshold value TH. If (p+q)<TH, the near-underrun indicator will be asserted.

Figure 8:
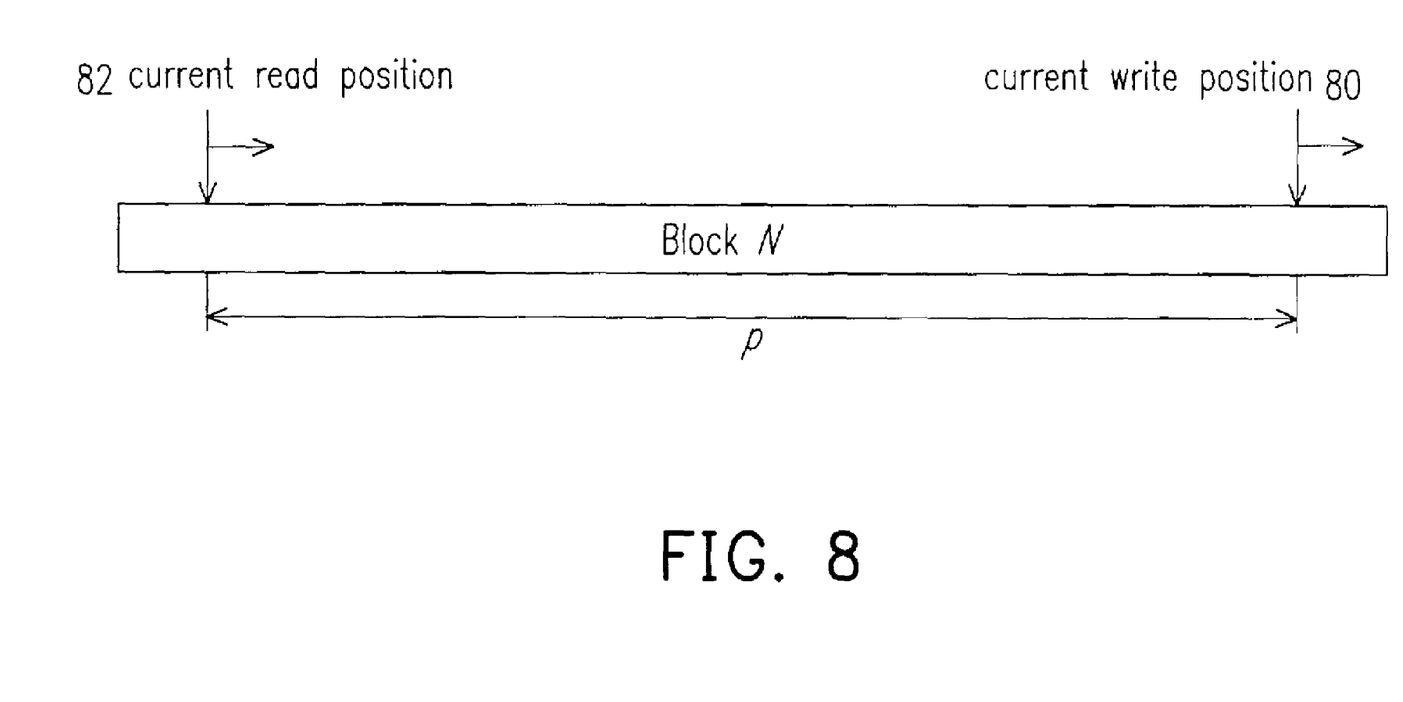
FIG. 8 is a schematic diagram of the write/read operations performed on the blocks of the line buffer, where both write and read operations are performed on block N, but the current write position is ahead of the current read position.

Case 4: Read and write operations occur in the same block N of the line buffer 106. As shown in FIG. 8, reference numerals 80 and 82 designate the current write position and the current read position respectively. Noted that the read and write operations are made on the blocks of the line buffer 106 from left to right as time increases. The status detector 116 is utilized to obtain the line difference and pixel difference p by means of the line difference counter 510 and the pixel difference counter 512 respectively. The pixel difference p is then compared by the judgment circuit 514 with the threshold value TH. If p<TH, and near-underrun indicator will be asserted.

Figure 9:
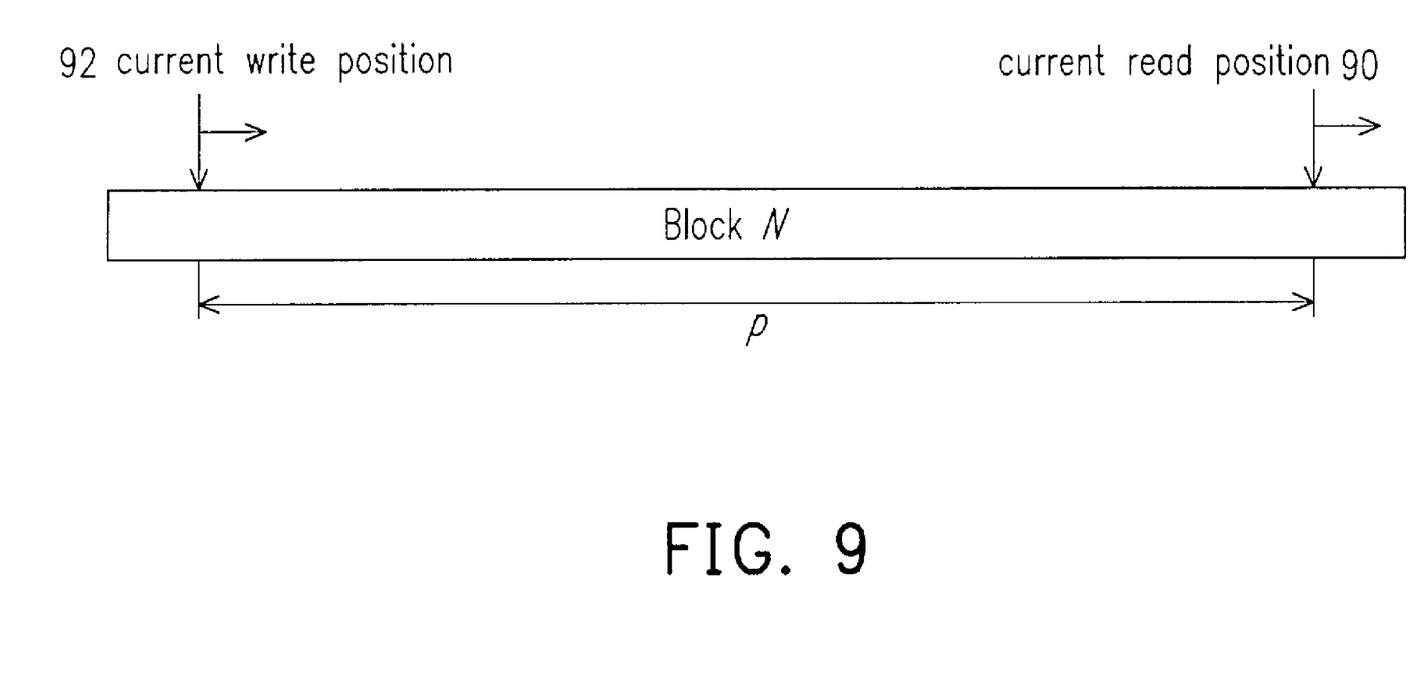
FIG. 9 is a schematic diagram of the write/read operations performed on the blocks of the line buffer, where both write and read operations are performed on block N, but the current read position is ahead of the current write position.

Case 5: Read and write operations occur in the same block N of the line buffer 106. As shown in FIG. 9, reference numerals 90 and 92 designate the current read position and the current write position respectively. Noted that the read and write operations are made on the blocks of the line buffer 106 from left to right as time increases. The status detector 116 is utilized to obtain the line difference and pixel difference p by means of the line difference counter 510 and the pixel difference counter 512 respectively. The pixel difference p is then compared by the judgment circuit 514 with the threshold value TH. If p<TH, and near-overrun indicator will be asserted.

Figure 10:
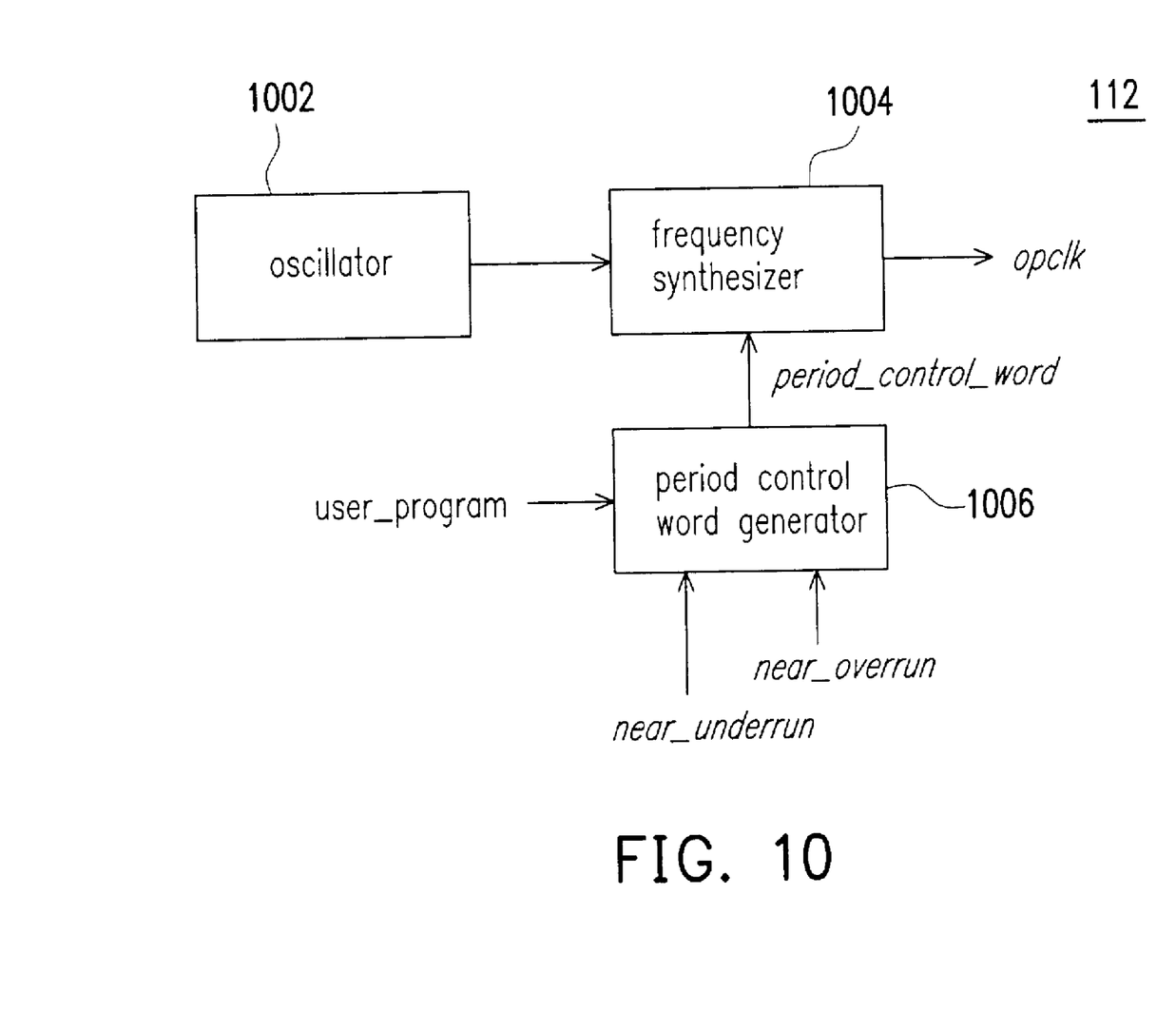
FIG. 10 is a detailed block diagram of the clock generator in FIG. 1 in accordance with the present invention.

Referring to FIG. 10, the block diagram of an output clock generator 112 is schematically illustrated. In FIG. 10, the output clock generator 112 comprises an oscillator 1002, a frequency synthesizer 1004, and a period control word generator 1006. The oscillator 1002 is used to provide a reference frequency for the frequency synthesizer 1004. The period control word generator 1006 receives the near-underrun and near-overrun indicators to generate a time-varying period_control_word for the frequency synthesizer 1004 when either the near-underrun indicator or the near-overrun indicator has been asserted. In this embodiment, the period control word generator 1006 retains an option to receive a value provided by user program to tune the period_control_word. The period control word generator 1006 can be implemented by means of adders, registers, combinational logic circuit or the like. The frequency synthesizer 1004 generates the output clock signal opclk in response to the reference frequency received from the oscillator 1002 and in response to the period_control_word received from the period control word generator 1006.

An innovative method is proposed to automatically fine tune the output clock frequency to keep no buffer underrun or overrun during the reading and writing operation on the blocks of line buffer. Especially, if the output clock is adjusted properly, the number of N blocks in the line buffer can be reduced or be replaced with less area storage element such as FIFO. The whole tuning process will be taken care by hardware without any firmware intervention. To achieve the goal of dynamically adjusting output clock, two circuits are implemented. First is the read/write status detector and second is output clock with dynamic capability. For the read/write status detector, it can detect how close are the read and write operations and compare it with threshold. If the value is larger than the threshold, a near overrun and near underrun status flag will be set.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display controller, comprising:
   a line buffer;
   input means for writing line data into said line buffer at an input line rate using a first clock;
   output means for reading said written line data from said line buffer at an output line rate using a second clock;
   a line buffer status detector electrically connected to said input means and said output means for generating a status signal indicating a position difference between a current write position and a current read position of said line buffer; and
   a clock generator for dynamically adjusting said output line rate in response to said status signal until said input line rate and said output line rate reach balance.

2. The display controller as claimed in claim 1, wherein said clock generator dynamically tunes the time period of said second clock responsive to said status signal so that said output line rate can be adjusted.

3. The display controller as claimed in claim 1, wherein said line buffer comprises a plurality of blocks connected in the form of a ring.

4. The display controller as claimed in claim 1, wherein said status detector further comprises:
   a write counter for identifying a write position when said input means writes into said line buffer;
   a read counter for identifying a read position when said output means reads from said line buffer;
   a position difference counter for generating a position difference signal in response to said write position and said read position; and
   a judgment circuit for generating said status signal in response to said position difference signal.

5. The display controller as claimed in claim 1, wherein said clock generator further comprises:
   an oscillator for providing a reference signal;
   a period control word generator for generating a period control word in response to said status signal; and
   a frequency synthesizer for generating said second clock in response to said reference signal and said period control word.

6. A method for balancing an input line rate and an output line rate of a display controller, the method comprising the steps of:
   (a) writing line data into a line buffer at said input line rate using a first clock;
   (b) reading said written line data from said line buffer at said output line rate using a second clock;
   (c) generating a line buffer status signal indicating a position difference between a current write position of said line buffer and a current read position of said line buffer; and
   (d) dynamically adjusting said output line rate in response to said status signal until said input line rate and said output line rate reach balance.

7. The method as claimed in claim 6, wherein step (d) comprises the step of dynamically tuning the time period of said second clock responsive to said status signal and thus adjusting said output line rate.

8. The method as claimed in claim 6, wherein step (c) further comprises the steps of:
   detecting a write position currently writing into said line buffer and a read position currently reading said line buffer;
   generating a position difference signal in response to said write position and said read position; and
   generating said status signal in response to said position difference signal.

9. The method of as claimed in claim 6, further comprising:
   providing a reference signal;
   generating a period control word in response to said status signal; and
   generating said second clock in response to said reference signal and said period control word.

10. A display controller, comprising:
    a line buffer;
    an input sampler for writing line data into said line buffer at an input line rate using a first clock;
    an upscaler for reading said written line data from said line buffer at an output line rate using a second clock;
    a line buffer status detector electrically connected to said input sampler and said upscaler for generating a status signal indicating a position difference between a current write position of said line buffer and a current read position of said line buffer; and
    a clock generator for dynamically adjusting said output line rate in response to said status signal until said input line rate and said output line rate reach balance.

11. The display controller as claimed in claim 10, wherein said clock generator dynamically tunes the time period of said second clock responsive to said status signal so that said output line rate can be adjusted.

12. The display controller as claimed in claim 11, wherein said clock generator further comprises:

an oscillator for providing a reference signal;

a period control word generator for generating a period control word in response to said status signal; and a frequency synthesizer for generating said second clock in response to said reference signal and said period control word.

13. The display controller as claimed in claim 10, wherein said line buffer comprises a plurality of blocks connected in the form of a ring.

14. The display controller as claimed in claim 10, wherein said status detector further comprises:

a write counter for identifying a write position when said input means writes into said line buffer;

a read counter for identifying a read position when said output means reads from said line buffer;

a position difference counter for generating a position difference signal in response to said write position and said read position; and a judgment circuit for generating said status signal in response to said position difference signal.

15. A method for balancing an input line rate and an output line rate of a display controller, the method comprising the steps of:

(a) writing line data into a line buffer at said input line rate using a first clock;

(b) reading said written line data from said line buffer at said output line rate using a second clock;

(c) generating a line buffer status signal indicating a position difference between a current write position of said line buffer and a current read position of said line buffer; and (d) dynamically adjusting said output line rate in response to said status signal until said input line rate and said output line rate reach balance.

16. The method as claimed in claim 15, wherein step (d) comprises the step of dynamically tuning the time period of said second clock responsive to said status signal and thus adjusting said output line rate.

17. The method as claimed in claim 16, wherein step (d) comprises the further steps of:

providing a reference signal;

generating a period control word in response to said status signal; and generating said second clock in response to said reference signal and said period control word.

18. The method as claimed in claim 15, wherein step (c) further comprises the steps of:

detecting a write position currently writing into said line buffer and a read position currently reading said line buffer;

generating a position difference signal in response to said write position and said read position; and generating said status signal in response to said position difference signal.

* * * * *